April 14, 1942.  R. H. MANNING  2,279,375
DEVICE FOR COMPUTING THE CONTENTS OF RECEPTACLES
Filed Nov. 16, 1938  2 Sheets-Sheet 1
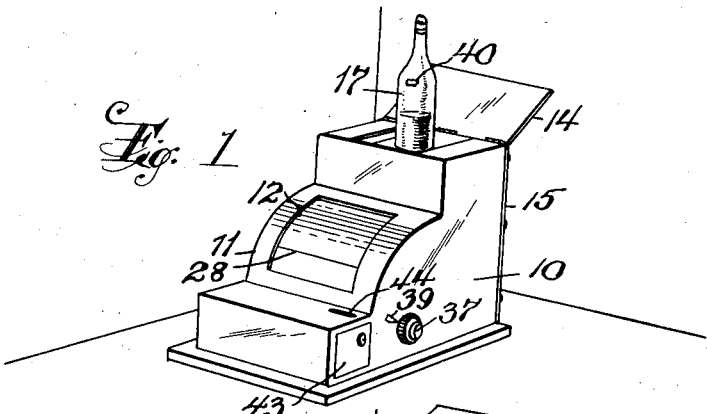
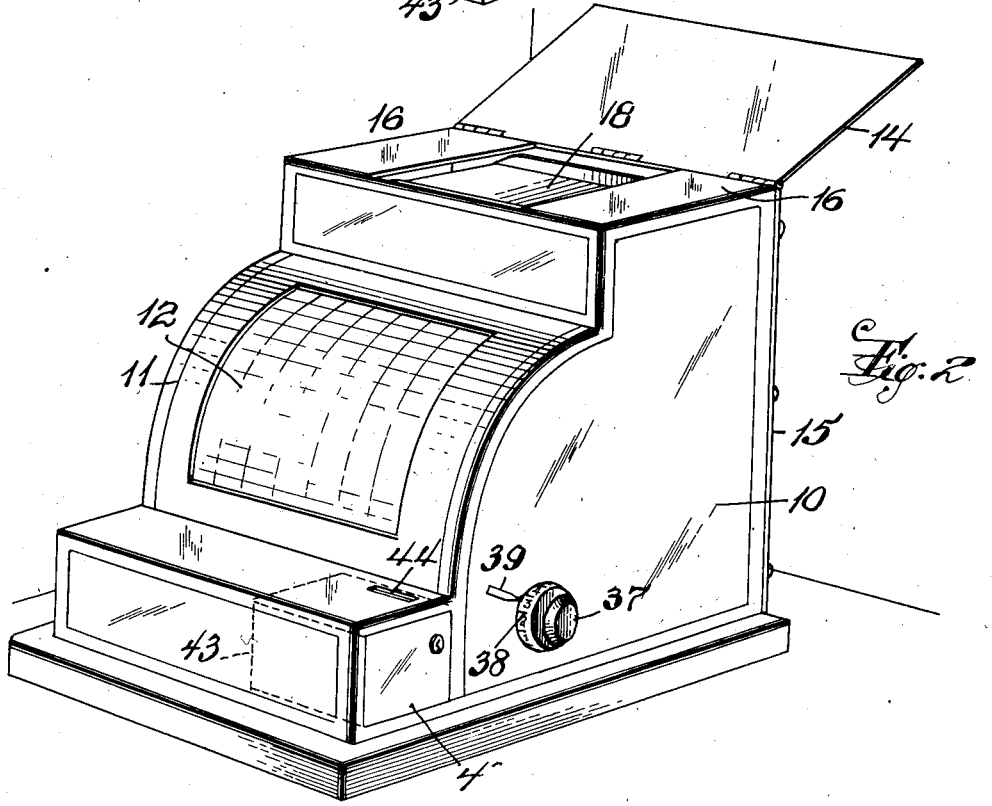
INVENTOR
Richard H. Manning.
BY
Wm. J. H. Caufield,
ATTORNEY April 14, 1942.                    R. H. MANNING                    2,279,375
                    DEVICE FOR COMPUTING THE CONTENTS OF RECEPTACLES
                            Filed Nov. 16, 1938              2 Sheets-Sheet 2
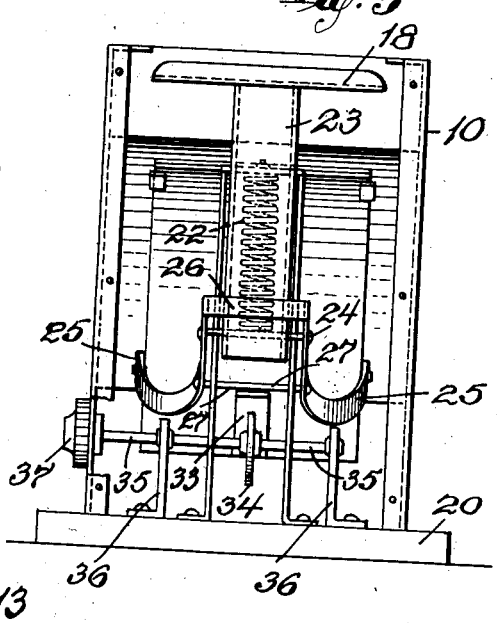
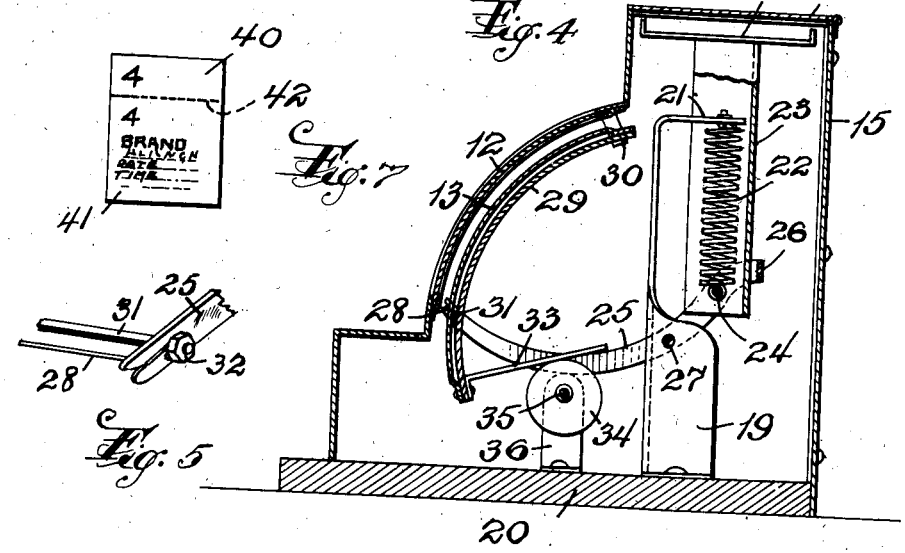
INVENTOR
Richard H. Manning
BY
Wm H Cranfield
ATTORNEY Patented Apr. 14, 1942

2,279,375

UNITED STATES PATENT OFFICE 2,279,375

DEVICE FOR COMPUTING THE CONTENTS OF RECEPTACLES

Richard H. Manning, Newark, N. J.

Application November 16, 1938, Serial No. 240,634

1 Claim. (Cl. 265—27)

This invention relates to an improved device for determining the contents of bottles, and similar receptacles, by weight. The invention is especially adapted for use in conjunction with records that enable a proprietor to determine from time to time the amount of beverage dispensed at the bar. It enables the proprietor to determine the comparative sales of various brands and the consumption of beverage as compared with cash receipts. The system of accounts and records is not detailed herein, the system, however, requiring the showing made by the present form of scale.

The invention is therefore directed to a scale on which bottles are weighed when full and then weighed from time to time, usually each day and the "take" from each bottle checked on its record.

The invention is illustrated in the accompanying drawings in which Figure 1 is a perspective view of a scale with a bottle in place. Figure 2 is an enlarged perspective view with no bottle on the machine. Figure 3 is a rear view of the scale with the back plate removed. Figure 4 is a cross-section of the scale. Figure 5 is a detail perspective of a part of the indicator used in the scale. Figure 6 is a plan view of one form of chart on which the indicator is arranged to register. Figure 7 is a view of a stamp to be used on bottles to identify them for successive weighings.

The object of the invention is to accurately indicate, by weight, the contents of a bottle and to provide for a setting of the indicating means of the scale at the same point for the same bottle at each weighing. This requires the use of identification means on the bottle and on the scale which means forms part of this invention.

The scale comprises a casing 10 of any desired form and the one illustrated comprises a curved front wall 11 provided with a transparent plate 12 through which the chart 13 can be seen. The casing also includes a cover 14, which is not essential, which cover is secured by hinges to a back plate 15. The cover normally lies over the top 16 which is open at the centre to permit the placing of a bottle 17 on the platform 18 of the scale.

The scale is mounted on a base 19 which is secured to the bottom 20 of the casing and has an extension 21 which supports the plate 23, on the top of which is the platform 18. The plate 23 is U-shaped and loosely embraces the extension 21 and descends between the side walls of the base 19. The spring 22 supports the plate 23 by means of the pin 24 which passes through the plate 23 and beyond on both sides for engagement with the double lever in the form of a stirrup with the side arms 25 through which the pin 24 passes. The stirrup form of lever is provided with a cross piece 26 and the arms 25 are pivoted on a rod 27 which is secured in the base 19. The ends of the arms 25 diverge and an indicator 28 extends across from one arm to the other and is arranged to register on a chart.

The chart 13 comprises a curved plate 29 which is curved on a radius with the rod 27 as a centre and is adjustable. On the front is the chart with a table shown in Figure 6 and which will be described hereinafter. The upper end of the curved plate 29 is shown supported on the fingers 30 and the chart 13 and its supporting plate 29 are spaced apart. In the space between the chart 13 and the plate 29 is arranged a rod 31 secured to the ends of the arms 25 to stiffen them. The rod 31 is held by nuts 32 which also serve to clamp the ends of the wire, which forms the indicator 28, against the arms 25 and hold the indicator taut.

The scale is provided with means for adjusting the relative normal positions of the indicator and the chart.

The illustration shows the chart as adjustable. The plate 29 is provided with a shelf 33 which rests on an eccentric 34 mounted on a shaft 35 in suitable bearings 36 which are secured to the base 20 of the casing. It will be evident that the adjustment will permit the registering of the indicator on the scale of the chart to establish the initial or normal position of a bottle when filled and a similar setting can be made for the same bottle when only partially filled. The shaft 35 is extended to the outside of the casing and can be manually operated by a knob 37. The knob has indicia, such as numbers, shown at 38, to register with a fixed marker 39.

The chart is shown in Figure 6 and is the one normally employed. The chart has a set of vertical columns and the chart shown is one for drinks of one and one-quarter ounces. The vertical scales show the number of drinks in a bottle in column 40ª, the chart indicating 26 in a quart and so on down the chart until only 1 is left. The chart shows a column at 41ª of ten cent drinks as the readings at 42ª show the price per drink. The ten cent column shows $2.60 as its value when full and the successive readings downward show the value of drinks remaining. The same is true of the other columns indicating drinks in the present scale up to 35 cents.

When a full quart bottle is put on the platform 18 the scale moves the indicator 28 up to the number 26 in column 40ª. If the weight of the bottle itself is such as to cause a deviation from this the knob 37 is turned to raise or lower the chart, as the case may be, until the normal registration for this particular bottle is attained. The bartender notes the indicia reading at 38 and heeds identification for future weighing of this particular bottle. The form of identification requires something readily attachable to the bottle. The identification is in the form of stamps properly numbered as is the indicia 38.

The stamp illustrated at 40 in Figure 7 is for a reading of 4 on knob 37 and is stuck on the bottle when first weighed and adjusted. The same reading, at 4, is applied to all future weighing of that bottle by turning the knob 37 so that 4 is opposite the marker 39. The stamp includes a similarly numbered tab 4 which is not adhesive and is torn off on the scored line 42 and deposited in a receptacle such as the receptacle 43 held in place by a suitable lock. The casing is provided with a slot 44 through which the tabs can be dropped. These tabs are removed daily and the owner can compute the volume of each brand to not only check on the popularity of a brand but also on any attempt at dilution, as the tabs contain the date of opening, the brand and any other pertinent information desired.

The owner can also keep records as to the number of drinks dispensed comparable to the number of drinks paid for according to the cash register returns.

It has heretofore been difficult for a proprietor of a tavern or the like to check on the dispensing of bottled goods and on the brands which have the most sales.

The system of book-keeping of which the scale is a necessary part has not been described in detail but sufficient has been described to enable one to understand the use of the scale. Suffice it to say that a bottle with its proper number on it can be weighed at any time and an accurate record of its sales made by weighing and recording the number and value of the drinks remaining and the number dispensed since the record on its last weighing.

The proportion and shape of various details can be altered without departing from the scope of the invention.

I claim:

A device for computing the contents of bottles comprising a casing having an opening in the front, a spring scale inside the casing and including a platform for receiving a bottle, a pivoted lever connected at one end to the platform and having an indicator at the other end and adapted to pass across the opening, a chart arranged in rear of the opening and in rear of the indicator, a plate on which the chart is supported, a shelf on the plate, an eccentric on which the shelf rests, a shaft on which the eccentric is mounted, said shaft extending to the outside of the casing, a knob on the outside end of the shaft, and indicating means on the knob for showing the position of the chart relative to the indicator.

RICHARD H. MANNING.